April 19, 1932. C. R. MASTIN ET AL 1,854,708
PACKING AND METHOD OF FORMING THE SAME
Filed March 19, 1928
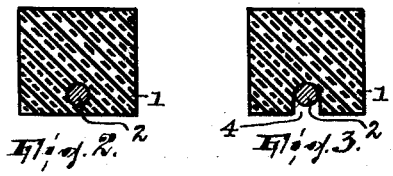
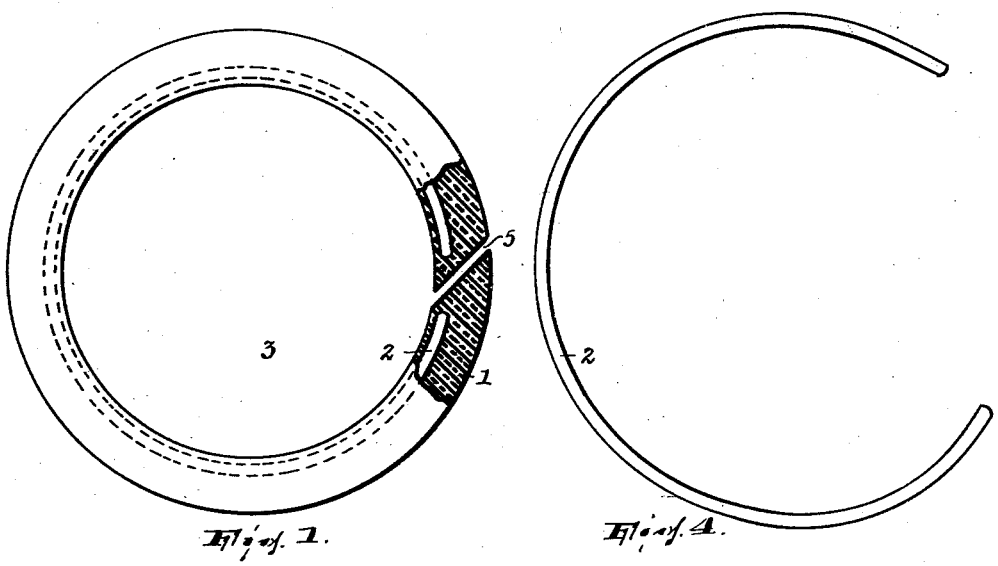
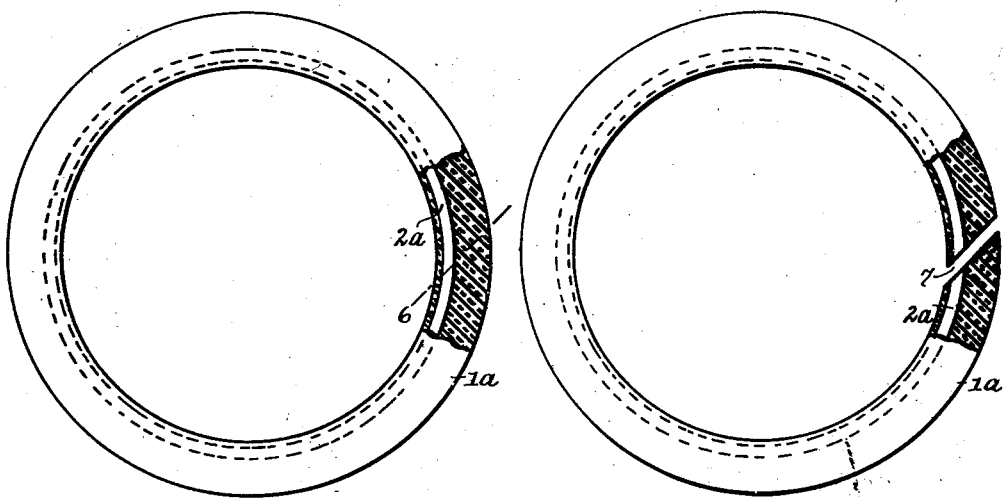

Patented Apr. 19, 1932

1,854,708

UNITED STATES PATENT OFFICE

CHARLES R. MASTIN, OF MIDLAND PARK, AND CHESTER M. ROE, OF HASBROUCK HEIGHTS, NEW JERSEY

PACKING AND METHOD OF FORMING THE SAME

Application filed March 19, 1928. Serial No. 262,699.

This invention relates to packings for pistons, plungers or the like elements (hereinafter termed plungers) reciprocating in cylinders or end walls thereof, and particularly to split stiff hard elastic packing rings usually formed of hard rubber or equivalent non-metallic substance.

The principal object is to provide a ring of this class which shall have these qualities, to wit: of forming a good seal and being capable of effective use for a longer period than others of such class; of making its introduction to and removal from sealing position easier of accomplishment than in the case of others of such class; and adaptability to the attainment of different sealing pressures. The improved ring comprises a split annular hard elastic body member and an annular elastic tensioning member carried thereby and normally exerting strain thereon to change its diameter from the normal (for example, where the outer periphery of the body member forms its sealing surface, to expand such body member) and preferably also split. The tensioning member may be permanently associated with the body member, but preferably it is separable therefrom so that the user can assemble with the body member any tensioning member of selected power and size so as to attain a desired degree of sealing pressure.

Broadly it is not material whether the tensioning member, in exerting the strain on the body member to change its diameter from the normal, acts to that end to expand it toward a surrounding surface against which it wipes or to contract it toward a surrounded surface against which it wipes: in this description we have elected to explain the invention when embodied in the former one of these two types.

In the drawings,

Fig. 1 is a plan of the improved packing ring, partly in section;

Figs. 2 and 3 are cross-sections of the improved ring, Fig. 2 showing a ring in which the tensioning member is permanently associated with the body member and Fig. 3 a ring in which the tensioning member is separable from the body member;

Fig. 4 shows the tensioning member before incorporation in the body member and in its normal state; and Figs. 5 and 6 illustrate a method of forming the ring which may in some instances be followed.

The split annular hard elastic body member is shown at 1, and may be a molded mass of hard rubber, rubber-composition, or equivalent substance; its outer periphery forms its sealing surface. The annular elastic tensioning member is shown at 2, and may be a split fillet or wire ring of some suitable spring metal. The member 2 is contained in the member 1 in surrounding relation to its opening 3, and this may be either by its being wholly embedded or buried therein (Fig. 2) or by the member 1 having at its inner periphery a seat, as a circumferential groove 4, receiving (separably) the member 2 (Fig. 3); the splits in the members will preferably in all cases be made to coincide. When the member 2, as by being wholly embedded in member 1, is permanently associated therewith the ring may be formed by placing the member 2 in the mold for member 1 when the latter is formed, and so that the splits in the two members will coincide so as to leave a split 5 in the finished ring, although neither member, as will hereinafter appear, need be split until after the molding is done: see Fig. 5, where an annular molded structure comprising the as-yet unsplit body and tensioning members 1a and 2a are shown, to be later cut, as on line 6, to leave the split 7 in Fig. 6.

In any case the elastic tensioning member 2 acts in the completed ring to exert strain on the body member to change its diameter from the normal (by which we mean, as detached from the member 2 and relaxed) thus, when the ring is in operative position between the parts to be sealed, to urge its sealing surface against that part against which it wipes—in the present example, by expanding said body member. This is because the diameter of the tensioning member in its normal state (by which we mean as detached from the body member and relaxed) is such that it could not be contained in member 1 without being subjected to flexing strain. Thus, in Fig. 4 the tensioning member is shown in its normal state as of such excessive diameter that in order for it to be embodied in the ring, as in Fig. 1, it must first be contracted. (Where the member 2 is already split when introduced into the mold it may be thus held contracted in the mold in any way until the molding and the setting of the material of member 1 is completed: but it need not necessarily be already split, for if it tends to change diameter due to its elasticity when, being endless, it is split, the result, so far as this invention is concerned, would be the same, as in Figs. 5 and 6).

It is known (see for example, German Patent No. 129,144) to provide a packing ring in which there is an elastic core capable of alteration in diameter and a part or member which in so far as it forms an envelope for and so contains the core, and in so far as it is formed of hard rubber and so is elastic, may be said to correspond to our body member 1. But our invention in its broadest concept differs from such a construction in this, that the member 2 normally exerts strain on the body member, and that it does not consist simply of an elastic core or equivalent with a containing member which, though elastic, is in a relaxed state when the ring is itself in a state of rest, as out of the sealing space and hence idle. This difference is important in that a ring constructed according to this invention will for certain reasons wear longer while effectually sealing than a ring of the said known type. Thus, assuming rings of both kinds having the same diameter when in their normal or idle state and identical in all other respects except that indicated to be operatively positioned between the parts to be sealed, the ring of the known type will cease to act as an effectual seal when due to wear it has assumed the diameter of its relaxed state, whereas after that diameter has been attained due to the wear our ring will still continue to expand and so act to seal because the attrition has reduced the mass and hence there has been a reduction of the resistance of the member 1 to the expanding influence of the member 2 (which is thus, as we herein term it, a tensioning member).

There are other respects in which our ring differs from the known type. Thus, the elastic member 2 is slender with reference to the member 1; and it is offset in said member 1 away from the sealing surface thereof. These are features which may be considered independently of any condition of strain exerted by either member on the other, and which contribute to reduce the stiffness of the ring, thereby facilitating its entry to and removal from working position, and to increase the life of the ring by providing a superior mass of the material of member 1 between its sealing surface and member 2.

Having thus fully described our invention, what we claim is:

1. A packing ring comprising a split annular hard elastic body member and an annular elastic tensioning member carried by, and surrounding the opening in, the body member and exerting strain thereon to change its diameter when the ring is free and unconfined.

2. A packing ring comprising a split annular hard elastic body member having around its opening a seat and an annular elastic tensioning member removably carried by said seat and surrounding the opening in the body member and exerting strain on the latter to change its diameter when the ring is free and unconfined.

3. A packing ring comprising a split annular hard elastic body member and a split annular elastic tensioning member carried by, and surrounding the opening in, the body member and exerting strain thereon to change its diameter when the ring is free and unconfined.

4. The method of forming the hereindescribed ring which consists in molding into annular form a plastic material adapted when molded to form a hard plastic mass while maintaining in the plastic material during the molding and until such material is set and in surrounding relation to the opening in such form a stiff elastic annulus in a state of flexing tension, whereby with such ring split it will assume out of the mold a different diameter from that in which it was molded.

In testimony whereof we affix our signatures.

C. R. MASTIN.
C. M. ROE.